United States Patent
Tanaka et al.

(10) Patent No.: US 12,459,455 B2
(45) Date of Patent: Nov. 4, 2025

(54) CONTROL DEVICE

(71) Applicant: HITACHI ASTEMO, LTD., Hitachinaka (JP)

(72) Inventors: Yuya Tanaka, Tokyo (JP); Yoshitaka Fukasawa, Tokyo (JP); Satoshi Matsuda, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/553,281

(22) PCT Filed: Mar. 9, 2022

(86) PCT No.: PCT/JP2022/010225
§ 371 (c)(1),
(2) Date: Sep. 29, 2023

(87) PCT Pub. No.: WO2023/026535
PCT Pub. Date: Mar. 2, 2023

(65) Prior Publication Data
US 2024/0174194 A1     May 30, 2024

(30) Foreign Application Priority Data

Aug. 24, 2021   (JP) ................................ 2021-136473

(51) Int. Cl.
*B60R 21/0134* (2006.01)
*B60R 21/013* (2006.01)
(Continued)

(52) U.S. Cl.
CPC ...... *B60R 21/013* (2013.01); *B60R 21/01542* (2014.10); *E05B 77/02* (2013.01); *E05B 77/24* (2013.01); *G08G 1/16* (2013.01)

(58) Field of Classification Search
CPC . B60R 21/013; B60R 21/0134; B60R 21/015; B60R 21/01542; E05B 77/02;
(Continued)

(56) References Cited

U.S. PATENT DOCUMENTS

2021/0101529 A1\*   4/2021   Thorngren .............. E05B 85/10

FOREIGN PATENT DOCUMENTS

JP    2008-158578 A    7/2008
JP    2011-113150 A    6/2011
(Continued)

OTHER PUBLICATIONS

International Search Report with English Translation and Written Opinion of International Patent Application No. PCT/JP2022/010225 dated May 31, 2022 (12 pages).

*Primary Examiner* — Jacob M Amick
(74) *Attorney, Agent, or Firm* — Foley & Lardner LLP (57) ABSTRACT

A control device according to the present disclosure is to provide greater safety than in the conventional system for the occupant while alighting from the vehicle. A control device 10 is mounted on a vehicle 1. The control device 10 includes an attention degree estimation unit 11 and an alighting restriction unit 12. Based on at least one of results detected by an occupant sensor 3 for detecting motion of an occupant of the vehicle 1 and detected by a vehicle sensor 4 for detecting a state of the vehicle 1, the attention degree estimation unit 11 estimates a degree of attention of the occupant to an approaching object approaching the vehicle 1. When the degree of attention of the occupant estimated by the attention degree estimation unit 11 is below the predetermined threshold, the alighting restriction unit 12 causes at least one of the door opening/closing device 6, the audio output device 7, and the image display device 8 in the vehicle 1 to execute the alighting restriction operation.

10 Claims, 3 Drawing Sheets

(51) Int. Cl.
*B60R 21/015* (2006.01)
*E05B 77/02* (2014.01)
*E05B 77/24* (2014.01)
*G08G 1/16* (2006.01)

(58) Field of Classification Search
CPC ........ E05B 77/24; E05B 77/245; E05B 77/26; E05F 15/40; G08G 1/16
See application file for complete search history.

(56) References Cited

FOREIGN PATENT DOCUMENTS

| | | | |
|---|---|---|---|
| JP | 2012-221414 | A | 11/2012 |
| JP | 2014-223886 | A | 12/2014 |
| JP | 2020-037813 | A | 3/2020 |
| JP | 2020-093567 | A | 6/2020 |

* cited by examiner

CONTROL DEVICE

TECHNICAL FIELD

The present disclosure relates to a control device mounted on a vehicle.

BACKGROUND ART

Conventionally, there is known an alighting assistance device configured to reliably detect an approaching object approaching a self-vehicle to increase safety for an occupant of the vehicle while alighting from the vehicle (see Patent Literature 1 below). An alighting assistance device disclosed in Patent Literature 1 includes an approaching object detection unit, an alighting restriction unit, an alighting motion detection unit, a control unit, and a plurality of first detection units.

The approaching object detection unit is configured to detect the approaching object approaching the self-vehicle from rear side of the self-vehicle. The alighting restriction unit is configured to execute an alighting restriction operation including an alarm operation as an operation of raising an alarm for a door of the self-vehicle and/or a door opening restriction operation as an operation of restricting opening of the door. The alighting motion detection unit is configured to detect alighting motion as motion of the occupant of the self-vehicle to alight from the vehicle.

When the alighting motion is detected by the alighting motion detection unit and when the approaching object is detected by the approaching object detection unit, the control unit is configured to execute an alighting restriction control to cause the alighting restriction unit to execute the alighting restriction operation for at least the door closest to the approaching object. Each of the plurality of first detection units is configured to detect an object surrounding the self-vehicle. At least two of the plurality of first detection units also function as second detection units, each configured to detect the approaching object approaching the self-vehicle from rear side of the self-vehicle.

Based on a result detected by at least one of the plurality of first detection units, the control unit determines whether or not the self-vehicle is in a first state when being parked or being stopped, the first state in which a blocking object as an object disturbing detection of the approaching object is present behind the self-vehicle. On determination that the self-vehicle is in the first state, the control unit is configured to use, as the approaching object detection unit, a third detection unit that is one of the second detection units and is previously set to be used in the first state as the approaching object detection unit.

Based on the result detected by at least one of the plurality of first detection units, the control unit also determines whether or not the self-vehicle is in a second state when being parked or being stopped, the second state in which the blocking object is not present behind the self-vehicle. On determination that the self-vehicle is in the second state, the control unit is configured to use, as the approaching object detection unit, a fourth detection unit that is one of the second detection units and is previously set to be used in the second state as the approaching object detection unit.

CITATION LIST

Patent Literature

PTL 1: JP 2020-093567 A

SUMMARY OF INVENTION

Technical Problem

The alighting assistance device described above as a conventionally known system uses the third detection unit as an electronic outer mirror to detect the approaching object in the first state where the blocking object is present behind the self-vehicle, and uses the fourth detection unit as a rear-side radar to detect the approaching object in the second state where the blocking object is not present behind the self-vehicle (PTL 1, paragraph 0016). However, in this alighting assistance device, the electronic outer mirror used in the first state may not detect the approaching object due to, for example, heavy rain, dense fog, nighttime, or backlight, and the safety for the occupant while alighting from the vehicle 1 may thus be decreased.

A control device according to the present disclosure is to provide greater safety than in the conventional system for the occupant while alighting from the vehicle.

Solution to Problem

One aspect of the present disclosure provides a control device to be mounted on a vehicle, the control device including:

an attention degree estimation unit configured, based on at least one of results detected by an occupant sensor for detecting motion of an occupant of the vehicle and a vehicle sensor for detecting a state of the vehicle, to estimate a degree of attention of the occupant to an approaching object approaching the vehicle; and an alighting restriction unit configured, when the degree of attention of the occupant estimated by the attention degree estimation unit is below a predetermined threshold, to cause at least one of a door opening/closing device, an audio output device, and an image display device, each mounted on the vehicle, to execute an alighting restriction operation.

Advantageous Effects of Invention

The present disclosure provides a control device to be mounted on a vehicle, the control device configured to cause at least one of a door opening/closing device, an audio output device, and an image display device to execute an alighting restriction operation in response to a decreased degree of attention of an occupant of the vehicle, so as to provide greater safety than in a conventional system for the occupant while alighting from the vehicle.

DESCRIPTION OF EMBODIMENTS

Figure 1:
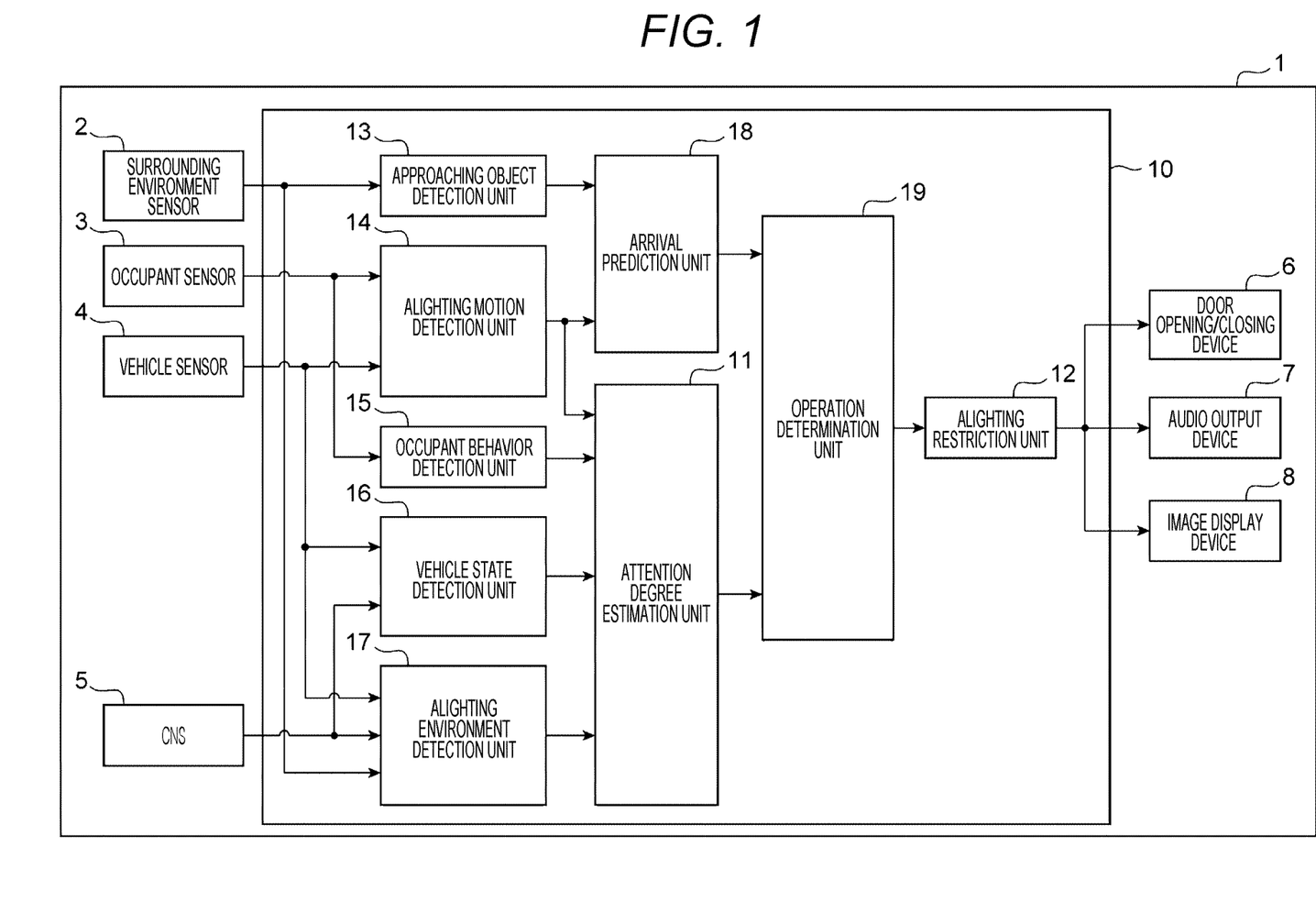
FIG. 1 is a functional block diagram of a control device according to an embodiment of the present disclosure.

A control device in a vehicle according to an embodiment of the present disclosure will be described below with reference to the drawings. FIG. 1 is a functional block diagram of the control device according to the embodiment.

A control device 10 of this embodiment is, for example, an electronic control device (ECU) to be mounted on a vehicle 1 such as a gasoline vehicle, a diesel vehicle, a natural gas vehicle, a hybrid vehicle, an electric vehicle, a fuel cell vehicle, or a hydrogen engine vehicle. While not illustrated, the control device 10 includes one or more microcontrollers including, for example, an input/output unit, a central processing unit (CPU), a memory, and a timer.

The vehicle 1 includes, for example, a surrounding environment sensor 2, an occupant sensor 3, a vehicle sensor 4, a car navigation system (CNS) 5, a door opening/closing device 6, an audio output device 7, and an image display device 8. While not illustrated, the vehicle 1 includes a drive system, a steering system, a braking system, and a control system for traveling, turning, decelerating, and stopping the vehicle 1.

The surrounding environment sensor 2 includes, for example, a millimeter wave radar, a monocular camera, a stereo camera, LiDAR, an ultrasonic sensor, a road-to-vehicle communication device, a vehicle-to-vehicle communication device, an illuminance sensor, a raindrop sensor, and a humidity sensor. The surrounding environment sensor 2 detects an object surrounding the vehicle 1 such as a road, a white line, a sign, a traffic light, a vehicle, a pedestrian, or an obstacle, or detects an environment surrounding the vehicle 1 such as illuminance, rainfall, humidity, or a visible distance of the obstacle, and outputs the object or the environment detected to the control device 10.

The occupant sensor 3 includes, for example, a seating sensor, a motion capture system, an eye tracker, a face authentication system, a voice recognition system, or a seat belt sensor. The occupant sensor 3 detects, for example, preliminary alighting motion as motion of an occupant of the vehicle 1 to alight from the vehicle 1, or age of the occupant, and outputs a result detected to the control device 10. The occupant sensor 3 detects the preliminary alighting motion, such as a movement of the occupant's view and body in a direction to the door, the occupant's utterance related to the alighting, or putting on/taking off a seat belt.

The vehicle sensor 4 includes various sensors for detecting a state of the vehicle, such as a wheel speed sensor, an acceleration sensor, and a shift position sensor, and detects speed, acceleration, and a transmission shift position of the vehicle 1, in addition to the state of the vehicle 1 such as a malfunction of the vehicle 1. The malfunction of the vehicle 1 detected by the vehicle sensor 4 corresponds to, for example, a malfunction related to tire air pressure, a residual amount of fuel, an engine, an anti-lock brake system (ABS), an airbag, a brake, hydraulic pressure, a battery, or a water temperature.

The vehicle sensor 4 also includes, for example, a door lever sensor, a door switch, or a touch sensor, and detects an alighting operation, such as the occupant's door lever operation or door switch operation, and a contact between the occupant's hand and the door lever or the door switch. The vehicle sensor 4 outputs the state of the vehicle and the alighting operation to the control device 10.

The CNS 5 includes, for example, a map information storage device, a route calculation device, the vehicle-to-vehicle communication device, the road-to-vehicle communication device, or a global navigation satellite system (GNSS) receiver. The CNS 5 also includes, for example, an input device for the occupant of the vehicle 1 to input a destination. The CNS 5 outputs to the control device 10, for example, map location information of the vehicle 1 based on position information thereof and route information of the vehicle 1 from the current spot to the destination.

The door opening/closing device 6 includes, for example, one or more actuators and a power transmission mechanism; and based on a control signal inputted from the control device 10, the door opening/closing device 6 automatically unlocks, opens, closes, and locks a hinged door, a sliding door, or other types of openable/closable doors of the vehicle 1. The audio output device 7 is, for example, a speaker provided in a cabin of the vehicle 1, and outputs alert or voice guidance based on the control signal inputted from the control device 10.

The image display device 8 is, for example, a liquid crystal display device, an organic EL display device, or a head-up display, and displays an image based on the control signal inputted from the control device 10. The image display device 8 may include an input device such as a touch panel or an operation button. For example, the occupant of the vehicle 1 may input information such as the destination to the CNS 5 through the input device in the image display device 8.

The control device 10 of this embodiment is mounted on the vehicle 1, and functions as an alighting assistance device to assist alighting of the occupant from the vehicle 1. The control device 10 includes an attention degree estimation unit 11 and an alighting restriction unit 12. The control device 10 may further include at least one of, for example, an approaching object detection unit 13, an alighting motion detection unit 14, an occupant behavior detection unit 15, a vehicle state detection unit 16, an alighting environment detection unit 17, an arrival prediction unit 18, and an operation determination unit 19.

FIG. 1 is a functional block diagram of the control device 10, showing units, each caused to function by the CPU (of the control device 10) executing a program stored in the memory (of the control device 10). Each of the units other than the attention degree estimation unit 11 and the alighting restriction unit 12 in the control device 10 may be caused to function by, for example, other ECU or microcontroller than the control device 10.

Figure 2:
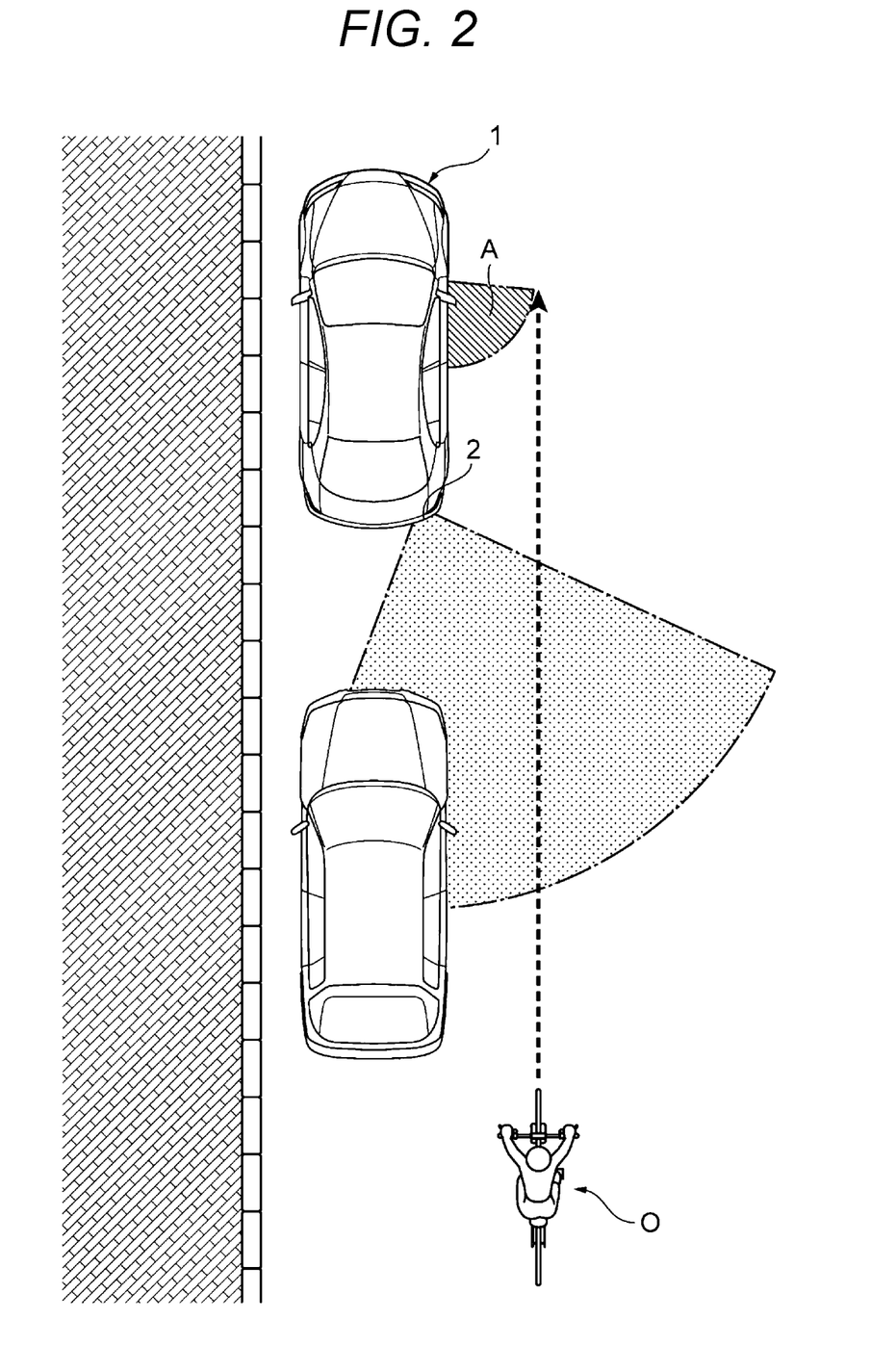
FIG. 2 is a plan view illustrating an example of an approaching object approaching a vehicle equipped with the control device of FIG. 1.
Figure 3:
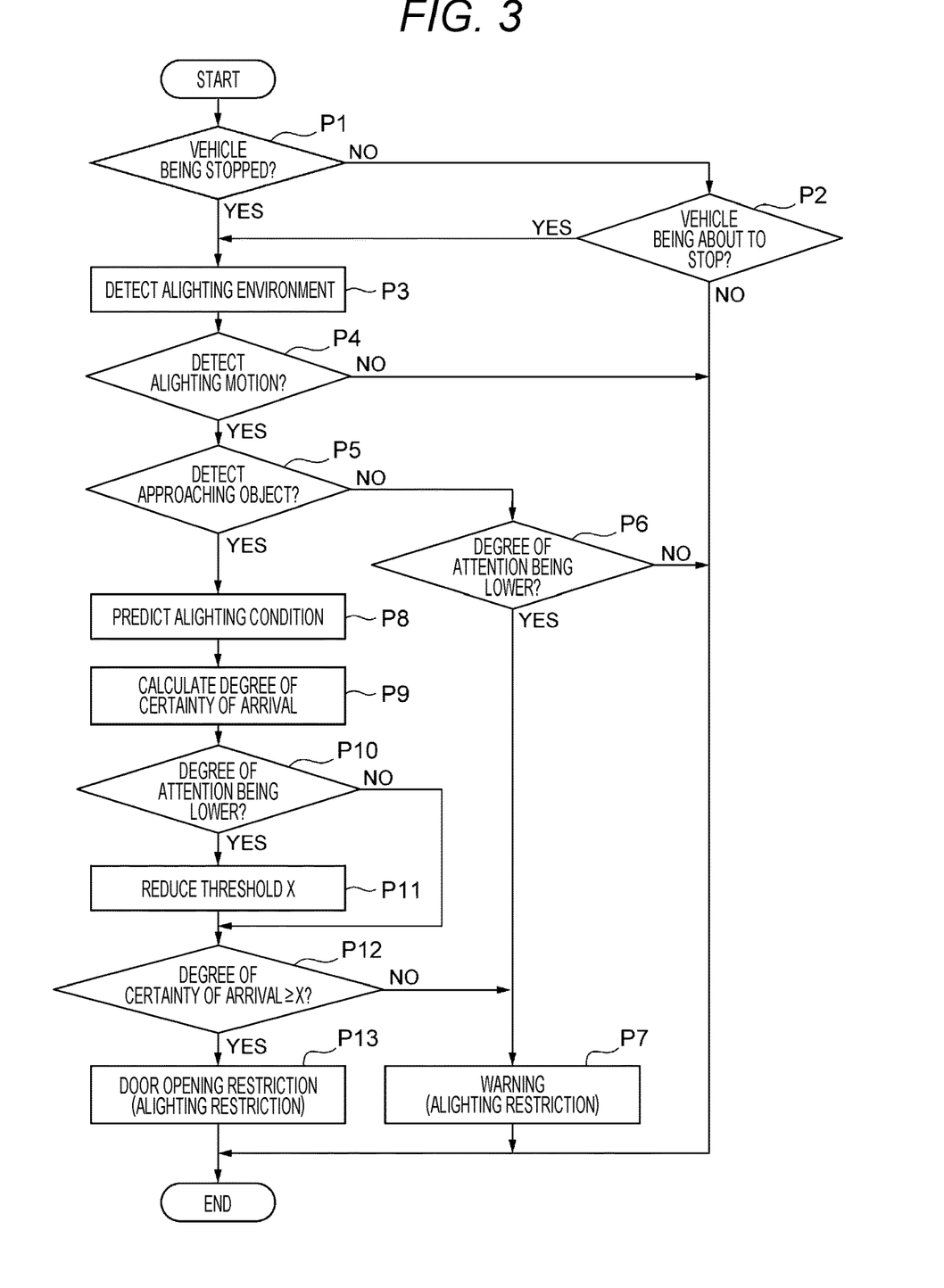
FIG. 3 is a flowchart describing an operation of the control device of FIG. 1.

An operation of each of the units in the control device 10 will be described below with reference to FIGS. 2 and 3. FIG. 2 is a plan view illustrating a state in which the vehicle 1 equipped with the control device 10 stops at a roadside. FIG. 3 is a flowchart describing an operation of the control device 10. For example, when a start-up switch of the vehicle 1 is turned on, the control device 10 is to repeat a process flow in FIG. 3 at a predetermined cycle.

When the process flow in FIG. 3 starts, the control device 10 first executes a process P1 to determine whether or not the vehicle 1 is stopped. In the process P1, the vehicle state detection unit 16 in the control device 10 determines whether or not the vehicle 1 is stopped based on, for example, a result detected and inputted by the wheel speed sensor or the acceleration sensor included in the vehicle sensor 4.

More specifically, for example, the wheel speed sensor detects rotation speed of wheels of the vehicle 1, and when the speed of the vehicle 1 estimated based on the rotation speed of the wheels is below a first threshold used to determine whether or not the vehicle 1 is stopped, the vehicle state detection unit 16 determines that the vehicle 1 is stopped. Alternatively, the vehicle state detection unit 16 may determine that the vehicle 1 is stopped based on, for example, a result detected by the shift position sensor in the vehicle sensor 4. Further, the vehicle state detection unit 16 detects, for example, a stop-time duration as a period of time during which the vehicle 1 is stopped.

In the process P1, when the vehicle state detection unit 16 determines that the vehicle 1 is not stopped (NO), the control device 10 executes a process P2 to determine whether or not the vehicle 1 is about to stop. In the process P2, for example, when the speed of the vehicle 1 goes below a second threshold that is higher than the first threshold for determining whether or not the vehicle 1 is stopped, the vehicle state detection unit 16 determines that the vehicle 1 is about to stop.

Alternatively, the vehicle state detection unit 16 may determine that the vehicle 1 is about to stop based on, for example, the traffic light, a road sign, and a road marking, each detected by the surrounding environment sensor 2, or map information for travel route of the vehicle 1 inputted from the CNS 5. In the process P2, when the vehicle state detection unit 16 determines that the vehicle 1 is not about to stop (NO), the control device 10 ends the process flow in FIG. 3.

In a contrast, when the vehicle state detection unit 16 determines that the vehicle 1 is stopped (YES) in the process P1 or when the occupant behavior detection unit 15 determines that the vehicle 1 is about to stop (YES) in the process P2, the control device 10 executes a process P3 to detect an alighting environment. In the process P3, the control device 10 causes, for example, the alighting environment detection unit 17 to detect the alighting environment. The alighting environment includes, for example, illuminance or weather surrounding the vehicle 1, the state of the vehicle 1 while waiting at the traffic light, traffic around the vehicle 1 such as traffic congestion, and location information related to a location where the vehicle 1 is stopped or is to be stopped.

More specifically, the alighting environment detection unit 17 detects, for example, the illuminance surrounding the vehicle 1 based on a result detected by the surrounding environment sensor 2 such as an illuminance sensor. The alighting environment detection unit 17 also estimates the weather surrounding the vehicle 1, such as sunny, cloudy, rainy, snowy, or foggy weather based on, for example, a result detected by the surrounding environment sensor 2 such as the raindrop sensor, the monocular camera, or the stereo camera, or an operating state of a wiper or a fog lamp of the vehicle 1.

The alighting environment detection unit 17 further estimates a visible distance of an approaching object O based on, for example, the result detected by the surrounding environment sensor 2 or weather information received by a receiver mounted on the vehicle 1. Further, the alighting environment detection unit 17 recognizes a display of the traffic light ahead of the vehicle 1 based on, for example, the road-to-vehicle communication or the result from the surrounding environment sensor 2 for detecting the object surrounding the vehicle 1, to detect the state of the vehicle 1 while waiting at the traffic light as well as to detect the traffic around the vehicle 1.

Still further, the alighting environment detection unit 17 detects the location information related to the location where the vehicle 1 is stopped or is to be stopped, such as a parking space, a traffic circle in front of a station, a road shoulder, or a road. The location information related to the location where the vehicle 1 is stopped or is to be stopped may be accurate location information based on high-precision, three-dimensional map information provided by the CNS 5.

When having completed the process P3 to detect the alighting environment, the control device 10 executes a process P4 to determine whether or not alighting motion of the occupant takes place. In the process P4, the alighting motion detection unit 14 in the control device 10 detects the alighting motion as motion of the occupant to alight from the vehicle 1 based on, for example, the result detected by the occupant sensor 3 or the vehicle sensor 4. The alighting motion here corresponds to, for example, action taken by the occupant before alighting from the vehicle 1.

The alighting motion includes, for example, the preliminary alighting motion and the alighting operation. The preliminary alighting motion includes, for example, the occupant's motion of taking off the seat belt, the movement of the occupant's view, the occupant's motion of shifting his/her weight, or the movement of his/her body while opening the door, and the occupant's greetings or utterance of keywords in alighting from the vehicle 1 such as "getting off". The alighting operation includes, for example, the occupant's door switch/door lever operation and the contact between the occupant's hand and the door switch/door lever. Such alighting motion is detected by the occupant sensor 3 or the vehicle sensor 4, and based on at least one of the results detected by the occupant sensor 3 and the vehicle sensor 4, the alighting motion detection unit 14 determines whether or not the alighting motion takes place.

The alighting motion detection unit 14 detects the alighting motion including the preliminary alighting motion of the occupant as has been described above, and thus predicts, in a speedier manner, that the occupant is to alight from the vehicle. The alighting motion detection unit 14 also predicts a period of time until the occupant alights from the vehicle 1 or until the occupant opens the door of the vehicle 1 based on the alighting motion detected. Then, the alighting motion detection unit 14 outputs the period of time predicted to attention degree estimation unit 11 and the arrival prediction unit 18.

In the process P4, when the alighting environment detection unit 17 determines that the alighting motion of the occupant does not take place (NO), the control device 10 ends the process flow in FIG. 3. In a contrast, when the alighting environment detection unit 17 determines that the alighting motion takes place (YES) in the process P4, the control device 10 executes a process P5 to determine whether or not the approaching object O is detected.

In the process P5, the control device 10 determines, for example, whether or not the approaching object O is detected by the approaching object detection unit 13. The approaching object detection unit 13 detects the approaching object O approaching the vehicle 1 based on, for example, the result detected by the surrounding environment sensor 2 for detecting the object surrounding the vehicle 1. More specifically, as illustrated in FIG. 2, the approaching object detection unit 13 detects, based on the result detected by the surrounding environment sensor 2, the approaching object O as an object approaching an alighting area A of the vehicle 1 (being stopped) from rear side of the vehicle 1.

The rear side here corresponds to, for example, both rear left and rear right of the vehicle 1. The alighting area A is, for example, an area where the door of the vehicle 1 is opened or closed, or an area where the occupant of the vehicle 1 boards or alights on/from the vehicle 1. The alighting area A is set at the left or right of the vehicle 1 or in the surroundings of the vehicle 1, in accordance with a structure or position of the door. The alighting area A may be set, for example, adjacent to each of the doors of the vehicle 1. The approaching object detection unit 13 calculates location, speed, or moving direction of the object surrounding the vehicle 1 based on, for example, the result detected by the surrounding environment sensor 2, and detects the approaching object O.

The objects detected as the approaching object O by the approaching object detection unit 13 include, for example, a vehicle such as an automobile, a motorcycle, or a bicycle, and a moving object other than the vehicle, such as a pedestrian or an animal. Among the objects approaching the alighting area A, the approaching object detection unit 13 may detect, as the approaching object O, an object having time to arrival (i.e., a period of time until the object arrives in the alighting area A) below a predetermined time threshold. The time to arrival may be calculated similarly to time to collision (TTC). The approaching object detection unit 13 outputs, to the arrival prediction unit 18, approaching object information related to the approaching object O, such as location, speed, predicted route, and the time to arrival in each of the alighting areas A.

In the process P5, when the approaching object detection unit 13 determines that no approaching object O is detected (NO), the control device 10 executes a process P6 to determine a degree of attention of the occupant of the vehicle 1. In the process P6, the occupant behavior detection unit 15 in the control device 10 detects, based on the result detected by the occupant sensor 3, at least a type of the occupant alighting from the vehicle 1 or a distracted behavior of the occupant seen when the degree of attention of the occupant decreases.

More specifically, based on the result detected by the occupant sensor 3 such as the face authentication system or an in-vehicle camera, the occupant behavior detection unit 15 estimates the age of the occupant detected related to the alighting motion. Based on the age estimated, the occupant behavior detection unit 15 classifies the occupant (detected related to the alighting motion) into an age category, such as an infant, a pupil, a minor, an adult, or a senior citizen. The occupant behavior detection unit 15 outputs, as the type of the occupant alighting from the vehicle, the age and the age category estimated to the attention degree estimation unit 11. Further, the occupant behavior detection unit 15 detects the type of each of the occupants alighting from the vehicle, such as a driver or a passenger, based on a seating position of the corresponding occupant detected by the occupant sensor 3 or the vehicle sensor 4, and outputs the type detected to the attention degree estimation unit 11.

The occupant behavior detection unit 15 also detects distracted behavior seen when the degree of attention of the occupant of the vehicle 1 decreases, based on, for example, at least one of the results detected by the occupant sensor 3 and the vehicle sensor 4. The distracted behavior includes, for example, the occupant's insufficient safety confirmation before alighting from the vehicle 1 and the alighting motion during conversation between the occupants. More specifically, the occupant behavior detection unit 15 detects, as the occupant's insufficient safety confirmation before alighting from the vehicle 1, that the occupant's face or view is not directed to mirrors or the rear side of the vehicle 1 immediately before or during the alighting motion. Then, the occupant behavior detection unit 15 outputs the result detected to the attention degree estimation unit 11. Further, in order to detect the alighting motion during the conversation between the occupants of the vehicle 1, the occupant behavior detection unit 15 recognizes the alighting motion of each of the occupants and whether or not the corresponding occupant is uttering words, and outputs the result detected to the attention degree estimation unit 11.

The attention degree estimation unit 11 estimates the degree of attention of the occupant to the approaching object O approaching the vehicle 1 based on, for example, at least one of the results detected by the occupant sensor 3 for detecting the motion of the occupant of the vehicle 1 and the vehicle sensor 4 for detecting the state of the vehicle 1. Note that, in the process P6 subsequent to the process P5 in which the approaching object detection unit 13 has determined that no approaching object O is detected (NO), the attention degree estimation unit 11 still estimates the degree of attention of the occupant to the approaching object O, similarly to when the approaching object detection unit 13 has determined that the approaching object O is detected (YES).

More specifically, the attention degree estimation unit 11 estimates the degree of attention of the occupant to the approaching object O based on, for example, information inputted from at least one of the alighting motion detection unit 14, the occupant behavior detection unit 15, the vehicle state detection unit 16, and the alighting environment detection unit 17. The attention degree estimation unit 11 receives, for example, the alighting motion of the occupant inputted from the alighting motion detection unit 14, and receives at least one of the type and the distracted behavior of the occupant alighting from the vehicle that has been inputted from the occupant behavior detection unit 15.

The information inputted from the vehicle state detection unit 16 to the attention degree estimation unit 11 includes information detected by the vehicle state detection unit 16 as follows. The vehicle state detection unit 16 detects that the vehicle 1 is about to stop or that the vehicle 1 is being stopped, in addition to the period of time from stoppage of the vehicle 1, the transmission shift position of the vehicle 1, and the malfunction of the vehicle 1 based on the result detected by the vehicle sensor 4, and outputs the result detected to the attention degree estimation unit 11. The malfunction of the vehicle 1 detected by the vehicle state detection unit 16 corresponds to, for example, the malfunction related to the tire air pressure, the residual amount of gasoline, hydraulic pressure, the battery, and the cooling water, a collision between the vehicle 1 and the obstacle, or an emergency stop due to an operation of an automatic emergency brake (AEB).

The information inputted from the alighting environment detection unit 17 to the attention degree estimation unit 11 includes the alighting environment detected by the alighting environment detection unit 17. The alighting environment detection unit 17 detects the alighting environment based on, for example, the information inputted from at least one of the surrounding environment sensor 2, the vehicle sensor 4, and the CNS 5. As has been described above, the alighting environment includes, for example, the illuminance or the weather surrounding the vehicle 1, the state of the vehicle 1 while waiting at the traffic light, the traffic around the vehicle 1 such as traffic congestion, and the location information related to the location where the vehicle 1 is stopped or is to be stopped.

The attention degree estimation unit 11 estimates that the degree of attention of the occupant to the approaching object O is lower when, for example, the alighting motion is detected immediately before the vehicle 1 stops, or when a period of time from the stoppage of the vehicle 1 until the alighting motion is detected is below a predetermined threshold. The attention degree estimation unit 11 also estimates the degree of attention of the occupant to the approaching object O based on, for example, the age/age category or the distracted behavior of the occupant detected by the occupant behavior detection unit 15. More specifically, the attention degree estimation unit 11 estimates that the degree of attention of the occupant to the approaching object O is lower when the distracted behavior as less attention paid to the surroundings of the vehicle 1 is detected, for example, when the occupant detected related to the alighting motion is an infant or a pupil and moving around inside the vehicle 1.

Here, the attention degree estimation unit 11 estimates that the degree of attention of the occupant is lower, in other words, sets the degree of attention of the occupant at a lower level or value. More specifically, the degree of attention of the occupant may be expressed at level such as high level, intermediate level, or low level, or a value from zero to 100. For example, the attention degree estimation unit 11 sets the degree of attention of each of the occupants at a predetermined initial value while the vehicle 1 is traveling. Then, immediately before or while the vehicle 1 is stopped, the attention degree estimation unit 11 decreases the degree of attention of the corresponding occupant that satisfies the condition described above, the condition on which the degree of attention is estimated to be lower.

The attention degree estimation unit 11 also estimates that the degree of attention of the occupant (that has been detected with alighting motion) is lower when his/her safety confirmation for the approaching object O is insufficient, such as when the occupant's view is not directed to the rear-view mirror, the side-view mirrors, or the rear side of the vehicle 1. The attention degree estimation unit 11 further estimates the degree of attention of the occupant to the approaching object O based on, for example, the display of the traffic light recognized by the alighting environment detection unit 17 and the transmission shift position of the vehicle 1 detected by the vehicle state detection unit 16.

More specifically, the attention degree estimation unit 11 estimates that the degree of attention of the occupant to the approaching object O is lower when the vehicle 1 is being stopped, when the transmission shift position is any other position than P, or when the traffic light is red (DO NOT ADVANCE). In such a situation, the occupant is about to alight from the vehicle 1 in a hurry before the traffic light turns green (PERMIT TO ADVANCE) and thus, the degree of attention of the occupant to the approaching object O is estimated to be lower.

Also, when the traffic around the vehicle 1 is congested, the attention degree estimation unit 11 estimates that the occupant pays less attention to the approaching object O. In such a situation, the occupant is about to alight from the vehicle 1 in a hurry before the temporarily stopped vehicle 1 advances, and due to blind spots caused by vehicles in front of and behind the vehicle 1, the degree of attention of the occupant to the approaching object O is estimated to be lower.

When the vehicle state detection unit 16 detects any malfunction of the vehicle 1, the attention degree estimation unit 11 estimates that the degree of attention of the occupant to the approaching object O is lower than when the vehicle state detection unit 16 does not detect any malfunction of the vehicle 1. The malfunction of the vehicle 1 detected by the vehicle state detection unit 16 includes the malfunction related to the tire air pressure, the residual amount of fuel, the engine, the ABS, the airbag, the brake, the hydraulic pressure, the battery, the water temperature, or others in the vehicle 1, each detected by the vehicle sensor 4. Thus, for example, when a decrease in tire air pressure is detected as the malfunction of the vehicle 1, attention of the driver of the vehicle 1 is directed to the tire as a spot of the malfunction, thereby decreasing his/her attention to the approaching object O.

Also, when the vehicle state detection unit 16 detects a contact between the vehicle 1 and an other vehicle or an object, the attention degree estimation unit 11 estimates that the degree of attention of the occupant to the approaching object O is lower than when the vehicle state detection unit 16 does not detect any contact. When the vehicle state detection unit 16 detects the contact, the attention of the occupant of the vehicle 1 is directed to the other vehicle or the object that the vehicle 1 contacts, or a point of the contact in the vehicle 1, thereby decreasing his/her attention to the approaching object O.

Still also, for example, when the vehicle state detection unit 16 detects an operation of the AEB or a sudden deceleration of the vehicle 1, the attention degree estimation unit 11 estimates that the degree of attention of the occupant to the approaching object O is lower than when the vehicle state detection unit 16 does not detect the operation of AEB or the sudden deceleration of the vehicle 1. At the operation of the AEB or the sudden deceleration of the vehicle 1, the attention of the occupant of the vehicle 1 is directed to the other vehicle or the object that causes the operation of the AEB or the sudden deceleration, or directed to whether or not the vehicle 1 contacts the other vehicle or the object, thereby decreasing his/her attention to the approaching object O.

Here, the vehicle state detection unit 16 detects the operation of the AEB and the sudden deceleration in addition to whether or not the vehicle 1 contacts the other vehicle or the object based on, for example, the result detected by the vehicle sensor 4. As the sudden deceleration, the vehicle state detection unit 16 detects, for example, approximately 0.4 [G] to 0.6 [G] that is higher than a normal deceleration rate of the vehicle 1. The vehicle state detection unit 16 may alternatively detect the operation of the AEB when detecting a deceleration rate of 0.6 [G] or more that is higher than a sudden deceleration rate by the driver of the vehicle 1. The vehicle state detection unit 16 may still alternatively detect the contact or collision between the vehicle 1 and the other vehicle or the object when detecting a deceleration rate that is higher than the deceleration rate for detecting the operation of the AEB.

As the illuminance surrounding the vehicle 1 and detected by the alighting environment detection unit 17 is lower, the attention degree estimation unit 11 estimates that the degree of attention of the occupant to the approaching object O is lower. Also, as the visible distance of the obstacle surrounding the vehicle 1, the visible distance estimated by the alighting environment detection unit 17, is decreased, the attention degree estimation unit 11 estimates that the degree of attention of the occupant to the approaching object O is lower. Such a decrease in illuminance and a decrease in visible distance of the obstacle surrounding the vehicle 1 is caused by the alighting environment such as nighttime, cloudy, rainy, snowy, or foggy weather, leading to degraded visibility of the approaching object O. Thus, the degree of attention of the occupant to the approaching object O is estimated to be lower.

Also, when the alighting environment detection unit 17 detects strong wind having a wind speed above or equal to a predetermined wind speed outside the vehicle 1, the attention degree estimation unit 11 estimates that the degree of attention of the occupant to the approaching object O is lower. When the strong wind affects opening/closing of the door of the vehicle 1 or the alighting of the occupant from the vehicle 1, the attention of the occupant is directed to the door or the alighting area A, thereby decreasing his/her attention to the approaching object O.

Still also, as an alighting difficulty level determined by the alighting environment detection unit 17 is higher, the attention degree estimation unit 11 estimates that the degree of attention of the occupant to the approaching object O is lower. As has been described above, the alighting environment detection unit 17 detects the location where the vehicle 1 is stopped or is to be stopped based on, for example, the output from the CNS 5 in the vehicle 1. Then, based on the location where the vehicle 1 is stopped or is to be stopped, the alighting environment detection unit 17 determines the alighting difficulty level. The alighting difficulty level determined by the alighting environment detection unit 17 begins with, for example, the parking space as the lowest, and goes higher in a sequential order of the traffic circle in front of the station, the road shoulder, the road, and a highway road. Alighting from the vehicle on the road shoulder of the highway or on the highway road may cause danger from other vehicles traveling at high speed.

In the process P6 in FIG. 3, the attention degree estimation unit 11 outputs, to the operation determination unit 19, the degree of attention of the occupant estimated. When the degree of attention of the occupant inputted from the attention degree estimation unit 11 is above a predetermined attention level or a predetermined threshold degree of attention, the operation determination unit 19 determines that the degree of attention of the occupant is not lower (NO). In this case, the control device 10 ends the process flow in FIG. 3 without executing any alighting restriction such as a warning or a door opening restriction by the operation determination unit 19 and the alighting restriction unit 12.

As has been described above, when the approaching object O is not detected in the process P5 and the degree of attention of the occupant is estimated to be higher in the process P6, the alighting restriction such as the warning or the door opening restriction is not executed. This eliminates inconvenience caused for the occupant to undergo unwanted alighting restrictions even when safety is ensured. Further, in the process P6, the degree of attention of the occupant (that is about to alight from the vehicle 1) to the approaching object O is confirmed to be sufficient. This provides greater safety to the occupant that is about to alight from the vehicle 1, even when the approaching object O may not be detected by the surrounding environment sensor 2.

In a contrast, when the degree of attention of the occupant inputted from the attention degree estimation unit 11 is below or equal to the predetermined attention level or the predetermined threshold degree of attention in the process P6, the operation determination unit 19 determines that the degree of attention of the occupant is lower (YES). In this case, the control device 10 executes a process P7 to perform the warning as the alighting restriction.

In the process P7, the operation determination unit 19 determines contents of the warning based on a level or a numerical value of the degree of attention of the occupant inputted from the attention degree estimation unit 11. More specifically, the operation determination unit 19 determines the contents of the warning to be performed by, for example, at least one of the audio output device 7 and the image display device 8. The warning performed by the audio output device 7 includes, for example, the output of alert or voice to draw the attention to the approaching object O. The warning performed by the image display device 8 includes display of an image or character to draw the attention to the approaching object O. The warning may include, for example, vibration of a steering wheel or a seat of the vehicle 1 by a vibration generator (not illustrated).

The operation determination unit 19 determines the alert or voice outputted from the audio output device 7 or the image or character displayed by the image display device 8 in accordance with, for example, the level or the numerical value of the degree of attention of the occupant inputted from the attention degree estimation unit 11. More specifically, when the level or the numerical value of the degree of attention of the occupant is below a predetermined level or numerical value, the operation determination unit 19 selects the warning in which, for example, volume of the alert/voice or size of the image/character, output time, and an output frequency are maximized.

In a contrast, when the level or the numerical value of the degree of attention of the occupant is above the predetermined level or numerical value, the operation determination unit 19 selects the warning in which, for example, the volume of the alert/voice or the size of the image/character, the output time, and the output frequency are minimized. When the level or the numerical value of the degree of attention of the occupant is below or equal to a minimum level or a lower limit value, the operation determination unit 19 may determine the door opening restriction to be performed by the door opening/closing device 6 as the warning. The operation determination unit 19 outputs to the alighting restriction unit 12 the warning determined or selected.

In the process P7 in FIG. 3, the alighting restriction unit 12 outputs a control signal for performing the warning as the alighting restriction inputted from the operation determination unit 19 to at least one of the door opening/closing device 6, the audio output device 7, and the image display device 8. Accordingly, the warning selected or determined by the operation determination unit 19 is to be performed by at least one of the door opening/closing device 6, the audio output device 7, and the image display device 8. Then, the control device 10 ends the process flow in FIG. 3.

In a contrast, when the approaching object detection unit 13 determines that the approaching object O is detected (YES) in the process P5 in FIG. 3, the control device 10 executes a process P8 to predict an alighting condition. In the process P8, the arrival prediction unit 18 in the control device 10 predicts the alighting condition based on, for example, the alighting motion of the occupant of the vehicle 1 inputted from the alighting motion detection unit 14. The alighting condition includes, for example, the alighting area A where the occupant alights from the vehicle 1, and alighting time at which the door of the vehicle 1 is open or the occupant of the vehicle 1 is present in the alighting area A. When having completed the process P8 to predict the alighting condition, the control device 10 executes a process P9 to calculate a degree of certainty of arrival.

In the process P9, the arrival prediction unit 18 in the control device 10 predicts arrival of the approaching object O at the alighting area A where the occupant alights from the vehicle based on, for example, the alighting condition predicted in the process P8 and information related to the approaching object O inputted from the approaching object detection unit 13. The arrival prediction unit 18 also calculates the degree of certainty of arrival that the approaching object O is to arrive in the alighting area A predicted at the alighting time predicted, based on the alighting condition and the information related to the approaching object O. For example, when the approaching object O passes through the alighting area A predicted prior to the alighting time predicted, or when the approaching object O is away from the alighting area A at a predetermined distance at the alighting time predicted, the degree of certainty of arrival calculated by the arrival prediction unit 18 is lower.

In a contrast, when the approaching object O is predicted to arrive in the alighting area A predicted at the alighting time predicted, or when the approaching object O is predicted to be closer to the alighting area A than the predetermined distance at the alighting time predicted, the degree of certainty of arrival calculated by the arrival prediction unit 18 is higher. When the approaching object O is detected in a low accuracy area where a detection accuracy is lower than a predetermined accuracy, such as in a vicinity of an outer edge of a range detected by the surrounding environment sensor 2, the degree of certainty of arrival calculated by the arrival prediction unit 18 is lower.

The degree of certainty of arrival is an indicator for the probability that the approaching object O arrives in the alighting area A predicted at the alighting time predicted. As the degree of certainty of arrival is higher, the probability that the approaching object O arrives in the alighting area A predicted at the alighting time predicted is higher; and as the degree of certainty of arrival is lower, the probability that the approaching object O arrives in the alighting area A predicted at the alighting time predicted is lower. For example, when the approaching object O is repeatedly detected at a predetermined cycle, and when the approaching object O is detected more frequently, the degree of certainty of arrival may be calculated to be higher.

Alternatively, when the approaching object O is repeatedly at the predetermined cycle, and when the approaching object O has the time to arrival in the alighting area A being continuously below or equal to the predetermined time threshold a greater number of times, the degree of certainty of arrival may be calculated to be higher. Still alternatively, when a plurality of the surrounding environment sensors 2 detect the approaching object O, the degree of certainty of arrival may be calculated to be higher; and when only one of the plurality of surrounding environment sensors 2 detects the approaching object O, the degree of certainty of arrival may be calculated to be lower.

Alternatively, the arrival prediction unit 18 may calculate a degree of certainty of alighting as an indicator for the probability that the occupant alights from the vehicle 1 in accordance with, for example, the alighting motion inputted from the alighting motion detection unit 14. For example, when the alighting motion inputted to the arrival prediction unit 18 is directly related to the alighting operation, such as the occupant's door lever operation or door switch operation, the degree of certainty of alighting calculated by the arrival prediction unit 18 is higher. In a contrast, when the alighting motion inputted to the arrival prediction unit 18 is the preliminary alighting motion, such as the movement of the occupant's view, the occupant's motion of shifting his/her weight, or the movement of his/her body, and is thus not directly related to the alighting operation, the degree of certainty of alighting calculated by the arrival prediction unit 18 is lower.

When having completed the process P9 in FIG. 3, the control device 10 executes a process P10 to determine the degree of attention of the occupant of the vehicle 1. Similarly to the process P6, in the process P10, the approaching object O was detected by the approaching object detection unit 13 in the process P5. Thus, the degree of attention of the occupant to the approaching object O is set to be lower than in the process P6 where the approaching object O was not detected in the process P5. Also, as the time to arrival calculated by the approaching object detection unit 13 is shorter, the attention degree estimation unit 11 estimates that the degree of attention of the occupant to the approaching object O is lower.

Similarly to the process P6, in the process P10, the attention degree estimation unit 11 outputs, to the operation determination unit 19, the degree of attention of the occupant estimated. When the degree of attention of the occupant inputted from the attention degree estimation unit 11 is below or equal to the predetermined attention level or the predetermined threshold degree of attention, the operation determination unit 19 determines that the degree of attention of the occupant is lower (YES). In this case, the control device 10 executes a process P11 to reduce a threshold degree of certainty of arrival X, and then executes a process P12 to determine the degree of certainty of arrival.

In the process P11, the operation determination unit 19 decreases the threshold degree of certainty of arrival X that is to be used in the process P12 to determine the degree of certainty of arrival, in accordance with the degree of attention of the occupant inputted from the attention degree estimation unit 11. In other words, as the degree of attention of the occupant to the approaching object O is lower, the threshold degree of certainty of arrival X is smaller. Similarly to the process P6, in the process P10, when the occupant satisfies more of a plurality of the conditions on which the degree of attention is estimated to be lower, the degree of attention of the occupant to the approaching object O is estimated to be lower.

In a contrast, in the process P10, when the degree of attention of the occupant inputted from the attention degree estimation unit 11 is above the predetermined attention level or the predetermined threshold degree of attention, the operation determination unit 19 determines that the degree of attention of the occupant is not lower (NO). In this case, the control device 10 ends the process P12 to determine the degree of certainty of arrival without executing the process P11 for reducing the threshold degree of certainty of arrival X. Thus, the threshold degree of certainty of arrival X does not decrease from its initial value.

In the process P12 to determine the degree of certainty of arrival, the operation determination unit 19 determines, for example, whether or not the degree of certainty of arrival calculated in the process P9 is above or equal to the threshold degree of certainty of arrival X. On determination that the degree of certainty of arrival is below the threshold degree of certainty of arrival X (NO) in the process P12, the operation determination unit 19 is to execute the process P7 for the warning and end the process flow in FIG. 3. In a contrast, on determination that the degree of certainty of arrival is above or equal to the threshold degree of certainty of arrival X (YES) in the process P12, the operation determination unit 19 is to execute a process P13 to perform the door opening restriction as the alighting restriction. The threshold degree of certainty of arrival X may be set different when determining whether or not to perform the door opening restriction from when determining whether or not to perform the warning.

In the process P13 for the door opening restriction, the operation determination unit 19 determines contents of the door opening restriction as the alighting restriction based on the level or the numerical value of the degree of attention of the occupant inputted from the attention degree estimation unit 11. More specifically, the operation determination unit 19 determines, for example, the door opening restriction by the door opening/closing device 6. The operation determination unit 19 determines the door opening restriction in accordance with, for example, whether the degree of certainty of arrival of the approaching object O in the alighting area A is higher or lower, or the time to arrival that the approaching object O has.

More specifically, for example, the degree of certainty of arrival is assumed to be above a first threshold, or the time to arrival is assumed to be below the first threshold. In this case, the operation determination unit 19 determines a first door opening restriction to be performed by the door opening/closing device 6 to keep the door of the vehicle 1 closed, regardless of the occupant's door switch operation or door lever operation of the vehicle 1. The first door opening restriction includes, for example, the warning performed by, for example, at least one of the audio output device 7 and the image display device 8.

Alternatively, for example, the degree of certainty of arrival is assumed to be below the first threshold and above a second threshold, or the time to arrival is assumed to be above the first threshold and below the second threshold. In this case, for example, when the occupant's door switch operation or door lever operation of the vehicle 1 has completed, the operation determination unit 19 determines whether or not to delay the opening of the door of the vehicle 1 by the door opening/closing device 6 compared with in the normal operation, or determines a second door opening restriction to stop the door in the middle of the opening operation. Here, the delay time of the opening of the door may vary in accordance with, for example, the degree of certainty of arrival, the time to arrival, or the degree of attention of the occupant. The second door opening restriction may include the warning performed by, for example, at least one of the audio output device 7 and the image display device 8.

Alternatively, for example, the degree of certainty of arrival is assumed to be below the second threshold, or the time to arrival is assumed to be above the second threshold. In this case, the operation determination unit 19 determines, for example, the warning to be performed by at least one of the audio output device 7 and the image display device 8 as a third alighting restriction operation. The warning by the audio output device 7 includes, for example, the output of the alert or voice to draw the attention to the approaching object O. The warning by the image display device 8 includes, for example, the display of the image or sentences to draw the attention to the approaching object O.

The operation determination unit 19 outputs the door opening restriction determined as the alighting restriction to the alighting restriction unit 12. The alighting restriction unit 12 outputs a control signal for performing the door opening restriction as the alighting restriction inputted from the operation determination unit 19 to at least one of the door opening/closing device 6, the audio output device 7, and the image display device 8. Accordingly, the door opening restriction selected or determined by the operation determination unit 19 is to be performed by at least one of the door opening/closing device 6, the audio output device 7, and the image display device 8. Then, the control device 10 ends the process flow in FIG. 3, and repeats the processes at a predetermined cycle.

As has been described above, the control device 10 of this embodiment is mounted on the vehicle 1, and includes the attention degree estimation unit 11 and the alighting restriction unit 12. The attention degree estimation unit 11 estimates the degree of attention of the occupant to the approaching object O approaching the vehicle 1 based on at least one of the results detected by the occupant sensor 3 for detecting the motion of the occupant of the vehicle 1 and the vehicle sensor 4 for detecting the state of the vehicle 1.

When the degree of attention of the occupant estimated by the attention degree estimation unit 11 is below the predetermined threshold, the alighting restriction unit 12 causes at least one of the door opening/closing device 6, the audio output device 7, and the image display device 8 in the vehicle 1 to execute the alighting restriction operation.

With such a configuration, in the control device 10 of this embodiment, the attention degree estimation unit 11 estimates the degree of attention of the occupant alighting from the vehicle 1 to the approaching object O. Thus, even when the approaching object O is not detected by the vehicle sensor 4 due to, for example, heavy rain, dense fog, nighttime, or backlight, the control device 10 causes at least one of the door opening/closing device 6, the audio output device 7, and the image display device 8 to execute the alighting restriction operation in accordance with a decrease in the degree of attention of the occupant. This configuration prevents the occupant of the vehicle 1 from alighting from the vehicle 1 carelessly, and thus prevents the occupant from contacting the approaching object O while alighting from the vehicle 1. This configuration further prevents the occupant from opening the door of the vehicle 1 carelessly, and thus prevents any contact between the door of the vehicle 1 and the approaching object O. Accordingly, the control device 10 of this embodiment provides greater safety than in the conventional system to the occupant while alighting from the vehicle 1.

The control device 10 of this embodiment further includes the vehicle state detection unit 16 configured to detect whether or not the vehicle 1 is stopped based on the result detected by the vehicle sensor 4, and the alighting motion detection unit 14 configured to detect the alighting motion of the occupant based on the result detected by the occupant sensor 3 or the vehicle sensor 4. Then, as the period of time from when the vehicle state detection unit 16 detects the vehicle 1 being stopped until when the alighting motion detection unit 14 detects the alighting motion is shorter, the attention degree estimation unit 11 estimates that the degree of attention of the occupant is lower.

With such a configuration, in a scene where the occupant is about to alight from the vehicle 1 in a hurry after stopping the vehicle 1 and his/her safety confirmation for the approaching object O approaching the alighting area A is thus insufficient, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the alighting environment detection unit 17 configured to recognize the display of the traffic light based on the result detected by the surrounding environment sensor 2 for detecting the object surrounding the vehicle 1, and the vehicle state detection unit 16 configured to detect the transmission shift position of the vehicle 1 based on the result detected by the vehicle sensor 4. Then, the attention degree estimation unit 11 estimates the degree of attention of the occupant based on the display of the traffic light recognized by the alighting environment detection unit 17 and the transmission shift position detected by the vehicle state detection unit 16.

With such a configuration, in a scene where the occupant is about to alight from the vehicle 1 in a hurry while the vehicle is stationary and waiting at the traffic light and his/her safety confirmation for the approaching object O approaching the alighting area A is thus insufficient, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the vehicle state detection unit 16 configured to detect the malfunction of the vehicle 1 based on the result detected by the vehicle sensor 4. When the vehicle state detection unit 16 detects the malfunction of the vehicle 1, the attention degree estimation unit 11 estimates that the degree of attention of the occupant is lower than when the vehicle state detection unit 16 does not detect any malfunction of the vehicle 1.

With such a configuration, in a scene where the occupant is about to alight from the vehicle 1 in a hurry to check out the malfunction of the vehicle 1 and his/her safety confirmation for the approaching object O approaching the alighting area A is thus insufficient, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the vehicle state detection unit 16 configured to detect the sudden deceleration of the vehicle 1 based on the result detected by the vehicle sensor 4. When the vehicle state detection unit 16 detects the sudden deceleration of the vehicle 1, the attention degree estimation unit 11 estimates that the degree of attention of the occupant is lower than when the vehicle state detection unit 16 does not detect any sudden deceleration of the vehicle 1.

With such a configuration, in a scene where the occupant is about to alight from the vehicle 1 in a hurry to see what caused the sudden deceleration of the vehicle 1 and his/her safety confirmation for the approaching object O approaching the alighting area A is thus insufficient, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the approaching object detection unit 13 configured to detect the approaching object O approaching the vehicle 1 based on the result detected by the surrounding environment sensor 2 for detecting the object surrounding the vehicle 1. When the approaching object detection unit 13 detects the approaching object O, the attention degree estimation unit 11 sets the degree of attention of the occupant to be lower than when the approaching object detection unit 13 does not detect the approaching object O.

With such a configuration, in the scene where the safety for the occupant alighting from the vehicle 1 in the alighting area A is decreased due to the approaching object O approaching the alighting area A of the vehicle 1, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 may be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the alighting environment detection unit 17 configured to detect the illuminance surrounding the vehicle 1 based on the result detected by the surrounding environment sensor 2 for detecting the object surrounding the vehicle 1. As the illuminance detected by the alighting environment detection unit 17 is lower, the attention degree estimation unit 11 estimates that the degree of attention of the occupant is lower.

With such a configuration, in a scene where the illuminance surrounding the vehicle 1 is decreased due to, for example, night time, in a tunnel, in a sun shade, or cloudy weather, leading to degraded detection accuracy of the approaching object O by the surrounding environment sensor 2 or the occupant's struggle in visual check on the approaching object O, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the alighting environment detection unit 17 configured to estimate the visible distance of the approaching object O based on the result detected by the surrounding environment sensor 2 for detecting the object surrounding the vehicle 1, or based on the weather information received by the receiver mounted on the vehicle 1. As the visible distance estimated by the alighting environment detection unit 17 is shorter, the attention degree estimation unit 11 estimates that the degree of attention of the occupant is lower.

With such a configuration, in the scene where the visible distance of the approaching object O is decreased due to, for example, rainy, snowy, or foggy weather, leading to degraded detection accuracy of the approaching object O by the surrounding environment sensor 2 or the occupant's struggle in visual check on the approaching object O, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 is likely to be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the alighting environment detection unit 17 configured to detect the location where the vehicle 1 is stopped or is to be stopped based on the output from CNS 5 in the vehicle 1 and configured to determine the alighting difficulty level based on the location. As the alighting difficulty level determined by the alighting environment detection unit 17 is higher, the attention degree estimation unit 11 estimates that the degree of attention of the occupant is lower.

With such a configuration, in a scene where the alighting difficulty level is higher in, for example, the highway or roads and the safety for the occupant alighting from the vehicle 1 in the alighting area A is thus decreased, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 may be decreased as has been described above, the alighting restriction unit 12 is facilitated to cause at least one of the door opening/closing device 6, the audio output device 7, and the image display device 8 in the vehicle 1 to execute the alighting restriction operation.

The control device 10 of this embodiment further includes the occupant behavior detection unit 15 configured, based on the result detected by the occupant sensor 3, to detect at least one of the age of the occupant of the vehicle 1 and the distracted behavior of the occupant seen when the degree of attention of the occupant of the vehicle 1 decreases. Then, based on the age or the distracted behavior of the occupant of the vehicle 1 detected by the occupant behavior detection unit 15, the attention degree estimation unit 11 estimates the degree of attention of the occupant of the vehicle 1.

With such a configuration, when the occupant is distracted by for example, an infant, a pupil, or other objects than the approaching object O and his/her safety confirmation is thus insufficient, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, when the occupant alights from the vehicle 1 while having less attention to the approaching object O as has been described above, the alighting restriction unit 12 is facilitated to cause at least one of the door opening/closing device 6, the audio output device 7, and the image display device 8 in the vehicle 1 to execute the alighting restriction operation.

In the control device 10 of this embodiment, the approaching object detection unit 13 calculates the time to arrival as the period of time until the approaching object O arrives in the alighting area A of the vehicle 1. As the time to arrival calculated by the approaching object detection unit 13 is shorter, the attention degree estimation unit 11 estimates that the degree of attention of the occupant is lower.

With such a configuration, in the scene where the approaching object O approaches the alighting area A and the safety for the occupant alighting from the vehicle 1 in the alighting area A is thus decreased, the attention degree estimation unit 11 estimates that the degree of attention of the occupant is lower. Here, the degree of attention of the occupant estimated by the attention degree estimation unit 11 is likely to go below the threshold that is used for the alighting restriction unit 12 to determine whether or not to execute the alighting restriction operation. Accordingly, in the scene where the safety for the occupant alighting from the vehicle 1 may be decreased as has been described above, the alighting restriction unit 12 is facilitated to cause at least one of the door opening/closing device 6, the audio output device 7, and the image display device 8 in the vehicle 1 to execute the alighting restriction operation.

As has been described above, this embodiment provides the control device 10 configured to cause at least one of the door opening/closing device 6, the audio output device 7, and the image display device 8 to execute the alighting restriction operation in response to the decreased degree of attention of the occupant of the vehicle 1, so as to provide greater safety than in the conventional system for the occupant while alighting from the vehicle.

A control device according to an embodiment of the present disclosure has been described above with reference to the drawings, but the detailed description of each configuration in the foregoing embodiment is to be considered in all respects as merely illustrative and thus is not restrictive; and various design modifications and changes may be made without departing from the scope of the present disclosure.

REFERENCE SIGNS LIST 1 vehicle
2 surrounding environment sensor
3 occupant sensor
4 vehicle sensor
5 car navigation system (CNS)
6 door opening/closing device
7 audio output device
8 image display device
10 control device
11 attention degree estimation unit
12 alighting restriction unit
13 approaching object detection unit
14 alighting motion detection unit
15 occupant behavior detection unit
16 vehicle state detection unit
17 alighting environment detection unit
A alighting area
O approaching object

The invention claimed is:

1. A control device to be mounted on a vehicle, the control device comprising:
   an attention degree estimation unit configured, based on at least one of results detected by an occupant sensor for detecting motion of an occupant of the vehicle and a vehicle sensor for detecting a state of the vehicle, to estimate a degree of attention of the occupant to an approaching object approaching the vehicle;
   an alighting restriction unit configured, when the degree of attention of the occupant estimated by the attention degree estimation unit is below a predetermined threshold, to cause at least one of a door opening/closing device, an audio output device, and an image display device, each mounted on the vehicle, to execute an alighting restriction operation;
   a vehicle state detection unit configured, based on the result detected by the vehicle sensor, to detect whether or not the vehicle is stopped; and
   an alighting motion detection unit configured, based on the result detected by the occupant sensor or the vehicle sensor, to detect alighting motion of the occupant,
   wherein as a period of time from when the vehicle state detection unit detects the vehicle being stopped until when the alighting motion detection unit detects the alighting motion is shorter, the attention degree estimation unit estimates that the degree of attention of the occupant is lower.

2. The control device according to claim 1, further comprising:
   an alighting environment detection unit configured, based on a result detected by a surrounding environment sensor for detecting an object surrounding the vehicle, to recognize a display of a traffic light,
   wherein the vehicle state detection unit is further configured, based on the result detected by the vehicle sensor, to detect a transmission shift position of the vehicle,
   wherein the attention degree estimation unit is further configured to estimate the degree of attention of the occupant based on a result of the display of the traffic light recognized by the alighting environment detection unit and a result of the transmission shift position detected by the vehicle state detection unit.

3. The control device according to claim 1, wherein the vehicle state detection unit is further configured, based on the result detected by the vehicle sensor, to detect a malfunction of the vehicle,
   wherein when the vehicle state detection unit detects the malfunction of the vehicle, the attention degree estimation unit estimates that the degree of attention of the occupant is lower than when the vehicle state detection unit does not detect any malfunction of the vehicle.

4. The control device according to claim 1, wherein the vehicle state detection unit is further configured, based on the result detected by the vehicle sensor, to detect a sudden deceleration of the vehicle,
   wherein when the vehicle state detection unit detects the sudden deceleration of the vehicle, the attention degree estimation unit estimates that the degree of attention of the occupant is lower than when the vehicle state detection unit does not detect any sudden deceleration of the vehicle.

5. The control device according to claim 1, further comprising an approaching object detection unit configured, based on a result detected by a surrounding environment sensor for detecting an object surrounding the vehicle, to detect the approaching object approaching the vehicle,
   wherein when the approaching object detection unit detects the approaching object, the attention degree estimation unit estimates that the degree of attention of the occupant is lower than when the approaching object detection unit does not detect any approaching object.

6. The control device according to claim 1, further comprising an alighting environment detection unit configured, based on a result detected by a surrounding environment sensor for detecting an object surrounding the vehicle, to detect illuminance surrounding the vehicle,
   wherein as the illuminance detected by the alighting environment detection unit is lower, the attention degree estimation unit estimates that the degree of attention of the occupant is lower.

7. The control device according to claim 1, further comprising an alighting environment detection unit configured, based on a result detected by a surrounding environment sensor for detecting an object surrounding the vehicle or weather information received by a receiver mounted on the vehicle, to estimate a visible distance of the approaching object,
   wherein as the visible distance detected by the alighting environment detection unit is shorter, the attention degree estimation unit estimates that the degree of attention of the occupant is lower.

8. The control device according to claim 1, further comprising an alighting environment detection unit configured to detect a location where the vehicle is stopped or is to be stopped based on an output from a car navigation system mounted on the vehicle, and configured to determine an alighting difficulty level based on the location,
   wherein as the alighting difficulty level determined by the alighting environment detection unit is higher, the attention degree estimation unit estimates that the degree of attention of the occupant is lower.

9. The control device according to claim 1, further comprising an occupant behavior detection unit configured, based on the result detected by the occupant sensor, to detect at least one of an age of the occupant and a distracted behavior of the occupant seen when the degree of attention of the occupant decreases,
   wherein based on a result of the age or the distracted behavior of the occupant detected by the occupant behavior detection unit, the attention degree estimation unit estimates the degree of attention of the occupant.

10. The control device according to claim 5, wherein the approaching object detection unit calculates time to arrival as a period of time until the approaching object arrives in an alighting area of the vehicle, and
   as the time to arrival calculated by the approaching object detection unit is shorter, the attention degree estimation unit estimates that the degree of attention of the occupant is lower.

* * * * *